US008103575B1

(12) United States Patent
Hinkle et al.

(10) Patent No.: US 8,103,575 B1
(45) Date of Patent: Jan. 24, 2012

(54) SYSTEM AND METHOD FOR USE IN AUDITING FINANCIAL TRANSACTIONS

(75) Inventors: Hal Hinkle, Geyserville, CA (US); Richard Raymond May, London (GB)

(73) Assignee: ICAP Services North America LLC, Jersey City, NJ (US)

( * ) Notice: Subject to any disclaimer, the term of this patent is extended or adjusted under 35 U.S.C. 154(b) by 251 days.

(21) Appl. No.: 11/389,737

(22) Filed: Mar. 27, 2006

(51) Int. Cl.
*G06Q 40/00* (2006.01)

(52) U.S. Cl. ............ 705/37; 705/1; 705/14.26; 705/30; 705/35; 705/36; 705/36 R; 705/44; 705/401; 707/200; 235/380; 713/176; 713/201

(58) Field of Classification Search ........... 705/1, 14.26, 705/30, 35, 36, 36 R, 37, 44, 401; 707/200; 235/380; 713/176, 201
See application file for complete search history.

(56) References Cited

U.S. PATENT DOCUMENTS

| | | | | |
|---|---|---|---|---|
| 5,097,115 A * | 3/1992 | Ogasawara et al. | ........... | 235/380 |
| 5,832,458 A * | 11/1998 | Jones | ................. | 705/14.26 |
| 6,185,683 B1 * | 2/2001 | Ginter et al. | ............ | 713/176 |
| 6,424,954 B1 * | 7/2002 | Leon | ...................... | 705/401 |
| 6,442,533 B1 * | 8/2002 | Hinkle | ................ | 705/36 R |
| 6,904,411 B2 * | 6/2005 | Hinkle | ...................... | 705/35 |
| 2001/0037284 A1 * | 11/2001 | Finkelstein et al. | ............ | 705/37 |
| 2002/0138376 A1 * | 9/2002 | Hinkle | ................... | 705/30 |
| 2002/0184527 A1 * | 12/2002 | Chun et al. | ................. | 713/201 |
| 2003/0046218 A1 * | 3/2003 | Albanese et al. | .............. | 705/37 |
| 2004/0254870 A1 * | 12/2004 | Chitaley et al. | ................. | 705/36 |
| 2005/0165668 A1 * | 7/2005 | Hinkle | ................... | 705/37 |
| 2005/0234807 A1 * | 10/2005 | Toffey | ...................... | 705/37 |
| 2005/0246278 A1 * | 11/2005 | Gerber et al. | .................. | 705/44 |
| 2006/0212486 A1 * | 9/2006 | Kennis et al. | ................. | 707/200 |
| 2007/0112579 A1 * | 5/2007 | Ratnakaran et al. | ............. | 705/1 |
| 2008/0010203 A1 * | 1/2008 | Grant | .............................. | 705/44 |

* cited by examiner

*Primary Examiner* — James Trammell
*Assistant Examiner* — Sanjeev Malhotra
(74) *Attorney, Agent, or Firm* — Dickstein Shapiro LLP

(57) ABSTRACT

A data processing system that records detailed market information for one or more financial markets to facilitate the audit of executed trades for time, quantity, and price as being reasonable. The system receives and records data from financial markets, including the date and time trades are executed and the prices at which the financial instruments traded. The system provides users the ability to compare a particular transaction for a financial instrument to transaction data for the same and/or related financial instruments at around the same time, to determine whether the price paid for the financial instrument is reasonable for the time the trade was executed. A trade confirmation service is also provided to permit traders to verify the parameters of executed transactions.

41 Claims, 8 Drawing Sheets

Fig. 2

Instrument: XYZ

| Time | Bids (Volume and Price) | | | Offers (Volume and Price) | | | Transactions (Volume and Price) |
|---|---|---|---|---|---|---|---|
| 05/05/05:09:45:55 | 5M at $95 | 1M at $100 | | 5M at $95 | 1M at $110 | 10M at $115 | 5M at $95 |
| 05/05/05:09:50:55 | 1M at $100 | 10M at $100 | 5M at $95 | 1M at $110 | 10M at $115 | | |
| 05/05/05:09:55:55 | 1M at $100 | 10M at $100 | 5M at $95 | 1M at $110 | 10M at $105 | 15M at $100 | 1M at $100 10M at $100 |

| | | | | | | | |
|---|---|---|---|---|---|---|---|
| 05/09/05:10:30:55 | 1M at $125 | 1M at $125 | 6M at $130 | 5M at $130 | 1M at $130 | 10M at $135 | 6M at $130 1M at $130 |
| 05/09/05:10:35:55 | 1M at $125 | 2M at $125 | 4M at $115 | 10M at $135 | 15M at $125 | | 1M at $125 2M at $125 |
| 05/09/05:10:40:55 | 4M at $115 | | | 10M at $135 | 12M at $125 | | |

| | | | | | | | |
|---|---|---|---|---|---|---|---|
| 05/09/05:15:30:55 | 4M at $115 | 1M at $140 | 1M at $140 | 5M at $145 | 5M at $140 | | 1M at $140 1M at $140 |
| 05/09/05:15:35:55 | 4M at $115 | | | 5M at $145 | 3M at $140 | | |
| 05/09/05:15:40:55 | 4M at $115 | 5M at $140 | | 5M at $145 | 3M at $140 | | 3M at $140 |

SYSTEM AND METHOD FOR USE IN AUDITING FINANCIAL TRANSACTIONS

BACKGROUND

Investment advisors and managers are subject to certain requirements under law to ensure that the trades they execute are reasonable, such as under the Employee Retirement Income Security Act of 1974 ("ERISA"). Under ERISA, a fiduciary must discharge his duties, including the duties related to brokerage selection, "with the care, skill, prudence, and diligence under the circumstances then prevailing that a prudent man would use in the conduct of an enterprise of like character and with like aims." ERISA §404(a)(1)(B). This fiduciary duty is commonly referred to as the prudent man rule. Under ERISA many brokers and dealers may qualify as fiduciaries because the Act defines a fiduciary as a party that: (1) exercises discretionary authority or control with respect to the management of the plan or the management or disposition of plan assets; (2) renders investment advice, with respect to plan assets, for a fee or other compensation (or has the authority or responsibility to render such advice); or (3) has discretionary authority or responsibility in the administration of the plan. Thus, for example, managers responsible for employee plans or who provide advice with respect to employee plans are typically considered fiduciaries with a duty to comply with the prudent man rule.

Fiduciaries must also comply with the "exclusive benefit rule" under Internal Revenue Code §401(a)(2). The exclusive benefit rule states that an ERISA plan must be operated for the exclusive benefit of its participants and their beneficiaries. The Department of Labor in an Information Letter issued to Refco, Inc. (Feb. 3, 1989) indicated that the prudent man rule, along with the exclusive benefit rule, impose upon a fiduciary the duty to obtain the best execution available in securities transactions and to monitor: (1) the quality of services provided by the broker; and (2) the reasonableness of commissions in relation to the totality of services received by the plan.

Recently the investment community has suffered from challenges to its integrity. For example, the mutual industry has suffered many scandals in recent years based on the execution of trades at the end of the day at off market prices, i.e., below the best price available on the market at the time of execution. Compliance officers and boards are now faced with the dilemma of what to do to ensure that plan managers fulfill their fiduciary duty to obtain the best price for any execution.

There are thus a wide variety of individuals and entities that have a fiduciary responsibility to ensure that the prices at which they buy or sell financial products are the best possible prices available. Normally this is done by requiring that every order have at least three possible sources of prices, or by using automated electronic platforms with an audit trail of execution. In addition, in order to ensure compliance with fiduciary duties, companies may hire consultants to review their traders' transactions for reasonableness. Consultants are able to compare specific transactions against historical data, as transaction data is commonly stored as time series by data vendors, however this data typically does not contain volume-traded information by price point. For example, stock prices are maintained by data providers (Reuters, Bloomberg, and even Yahoo! Finance) and used for graphs and charts, normally for displaying historical price movement and for technical analysis. Reviews currently are conducted by manually comparing a transaction to the chart of the price data of the security bought or sold. However, as noted above, these databases do not record trade size, and thus are of limited use to ensure compliance with fiduciary duties.

BRIEF SUMMARY OF THE INVENTION

The present invention provides a system and method for assisting in the audit of financial transactions involving financial products by providing audit reports of a transaction to the market at the time the transaction was executed. In one preferred embodiment, the system includes a database that stores historical transaction data that is used to compare a transaction or a group of transactions to the market at a particular time for a particular volume of a financial product. The transaction data maintained in the database preferably includes both price and volume data for use in evaluating the reasonableness of a transaction. The present system is also preferably adapted to provide a trade confirmation service that verifies the accuracy of transaction data entered by buyers and sellers.

BRIEF DESCRIPTION OF SEVERAL VIEWS OF THE DRAWINGS

FIG. 2 is a table depicting data preferably stored by electronic marketplaces in the present system;

FIG. 6 is a representation of a preferred embodiment of a report generated by the system in response to a customer service request;

FIG. 8 depicts a preferred embodiment of a graphical user interface for use by a trader to enter and confirm transaction data.

DETAILED DESCRIPTION OF THE INVENTION

Figure 1:
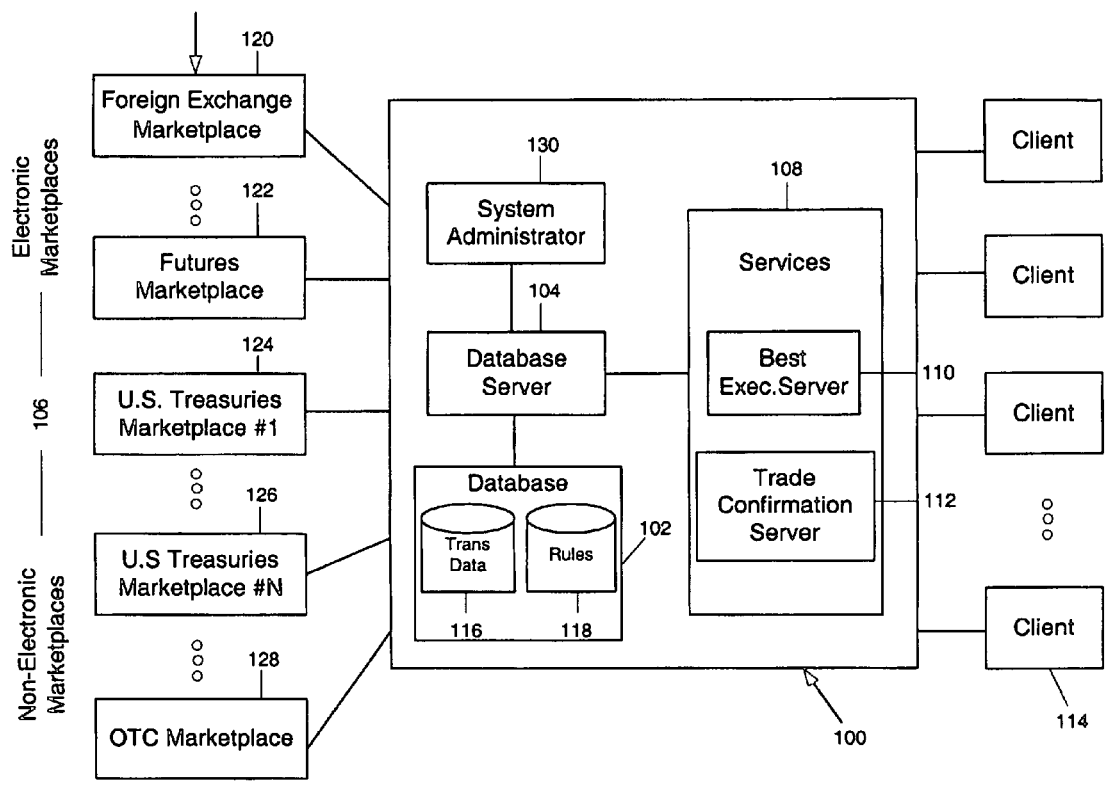
FIG. 1 is a block diagram illustrating components of a preferred embodiment of the present system.

FIG. 1 is a block diagram illustrating aspects of a preferred embodiment of the present system. As shown in FIG. 1, system 100 preferably comprises a database 102 and database server 104 adapted to receive and store market data from a plurality of marketplaces 106. System 100 further comprises a services component 108 including a best execution server 110 and a trade confirmation server 112 for responding to client requests submitted by system users via remote terminals 114, as described in more detail below. Database 102 preferably comprises transaction data storage 116 for storing transaction data received from marketplace 106 and terminals 114, and rules storage 118 for storing rules that define the manner in which system services are provided, as described in more detail below. System administrator 130 performs maintenance of the system and specifies the rules to be stored in rules storage 118.

Each marketplace 106 preferably comprises a physical or virtual location where trading occurs. Different marketplaces generate and store data in different ways. At one extreme, a marketplace may be all electronic, in which case all bids, offers, and executions are available electronically. At the other end of the spectrum are non-electronic markets, in which case access to market data requires that price and transaction data be collated and entered manually.

In the illustrative example of FIG. 1, marketplaces 106 comprise a number of electronic marketplaces including a first foreign exchange market 120, a futures exchange market 122, a U.S. Treasury bond market 124, and a non-U.S. Treasury securities market 126, as well as a non-electronic over-the-counter ("OTC") marketplace 128. The OTC marketplace may be a market for derivatives, or other markets that commonly trade over-the-counter. Additional marketplaces may, of course, be supported, as indicated by the ellipses in FIG. 1.

As illustrated in FIG. 2, each marketplace 106 preferably collects and maintains the following transaction information: the current bid (the best price wishing to buy) and current offer (best price wishing to sell); the bid quantity and offer quantity (the amount associated with the bid and offer); the remainder of its order book (all the bids and offers and associated quantities which are not the best); and a transaction log generated in real-time or essentially real-time as trades are executed. The offers and bids for the same instrument at the same price are summed in the table.

The transaction data collected at marketplaces 106 is preferably transmitted to database server 102 via appropriate communication links. In a preferred embodiment, an application program interface ("API") is provided to facilitate the data transmission. The API preferably comprises communication software, such as Tibco RV or Microsoft Com+.

The API is preferably adapted to electronically transfer data to database 104: (i) with each change of the information associated with a security or financial instrument, or (ii) at specified intervals of time. The API is programmed to define what data the marketplaces send to database server 104. In a preferred embodiment, data is sent via the API in the form of an electronic message that contains the following information: a header including the marketplace identification, instrument identification, and time; the current market, including a summary of orders at the best bid, best offer, and the quantities bid and/or offered; an orderbook, including a summary of prices below the market; and trades, including the trade amounts, price, and time of the trade. Marketplaces 106 preferably provide this data every 5 to 10 seconds for each instrument traded. This interval may be longer or shorter based on system processing capacity, but 10 seconds is the longest interval allowed in the preferred embodiment for marketplaces capable of providing data at that frequency.

Database server 104 stores the received transaction data from marketplaces 106 in database 102. Trading systems usually hold bids and offers for each customer on a price and time basis (best prices first, earliest at the same price first). Accordingly, database 102 preferably stores bids, offers, and transactions on a price, time basis, and all individual orders or transactions at the same price are summed. Database 102 also preferably stores information concerning data reporting cycles and market open hours for each marketplace 106.

Once the data has been captured and stored, it is ready for use by the system to provide customer services. System 100 is preferably adapted to provide at least the following services: (i) an audit service that (A) generates variance reports comparing an executed transaction or group of transactions to an expected-price range; or (B) generates variance reports comparing a proposed transaction or group of transactions to an expected-price range; and (ii) a trader confirmation service that confirms to a trader that trade data entered by the trader matches corresponding trade data entered by the counterparty to the trade.

Figure 3:
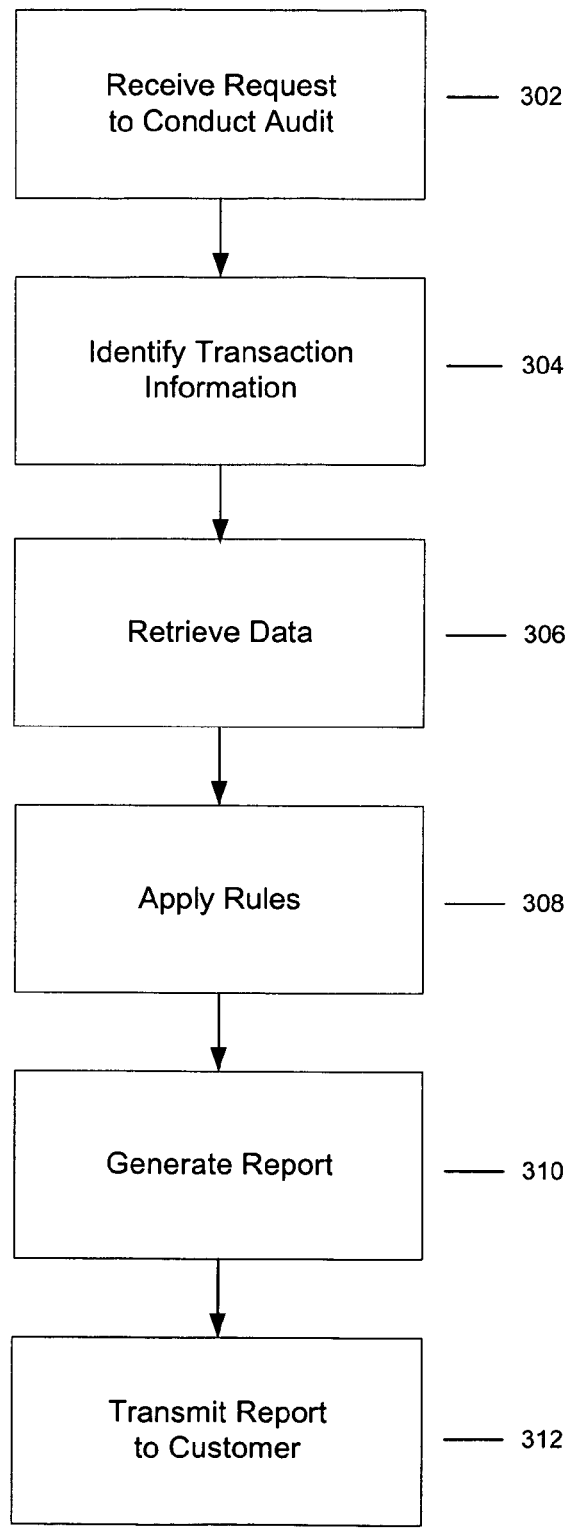
FIG. 3 is a flowchart illustrating aspects of system operation in a preferred embodiment.

A preferred embodiment for providing an audit service is now described in connection with FIG. 3. As illustrated in FIG. 3, customers transmit audit requests via terminals 114 to best execution server 110 (Step 302). Each request preferably comprises information concerning one or more transactions at one or more marketplaces 106 for which the customer desires an audit. In some preferred embodiments, the audit may be requested and conducted after execution of the transaction or transactions to be audited. In other preferred embodiments, the audit may be requested and conducted at the time of or prior to a proposed transaction. For example, a trader's workstation may be programmed to automatically request an audit of a proposed transaction at the time the trader enters a command to buy or sell. If the audit results returned by best execution server 110 are not satisfactory, the trader workstation or other appropriate component may be programmed to block the proposed transaction from executing.

For ease of illustration, the following discussion will describe processing of an audit request for a single transaction. It will be recognized, however, that an audit request may comprise any desired number of transactions, in which case system 100 preferably performs the following steps for each transaction to be audited.

Returning to FIG. 3, best execution server 110 parses the request and extracts the instrument traded and the marketplace where the transaction occurred (Step 304). Best execution server 110 then transmits this information to database server 104 which uses the information to retrieve from rules storage 118 any rules specified for conducting audits of transactions in the specified instrument at the specified marketplace (Step 306).

In a preferred embodiment, these audit rules may comprise a rule designating a class of transactions in other instruments and/or other marketplaces that should be considered in evaluating the transaction to be audited. For example, where the transaction to be audited is in a security traded in more than one marketplace 106, and in particular, where the transaction to be audited was conducted at a marketplace with low liquidity, it may be desirable in evaluating that transaction to consider not only transactions in the instrument conducted at that marketplace, but also transactions in the same instrument conducted at other marketplaces. Similarly, where the transaction to be audited is for an instrument whose price is mathematically linked to the price of another security, it may be desirable in evaluating that transaction to consider not only transactions in the instrument itself, but also transactions in the mathematically-related instrument.

In a preferred embodiment, the audit rules further comprise an expected-price rule and a variance rule. An expected-price rule specifies how the system should determine an expected (i.e., reasonable) price range for a transaction. A variance rule specifies the amount of difference between an actual transaction price and an expected-price range that should trigger an audit flag to the requestor. This allowable variance may be generated by the system or provided by a subscriber. Specific examples of expected-price and variance rules are described below.

Database server 104 utilizes the audit rules to identify and retrieve from transaction data storage 116 all transaction data required to respond to the audit request and transmits this transaction data, and any applicable expected-price and variance rules to best execution server 110 (Step 308). Best execution server 110 applies the received rules to run an audit of the submitted transaction and generates a variance report that identifies the relationship between the actual price of the transaction and the expected price for the transaction. A preferred embodiment for conducting such an audit will now be described in connection with FIG. 4 and two illustrative examples.

Figure 4:
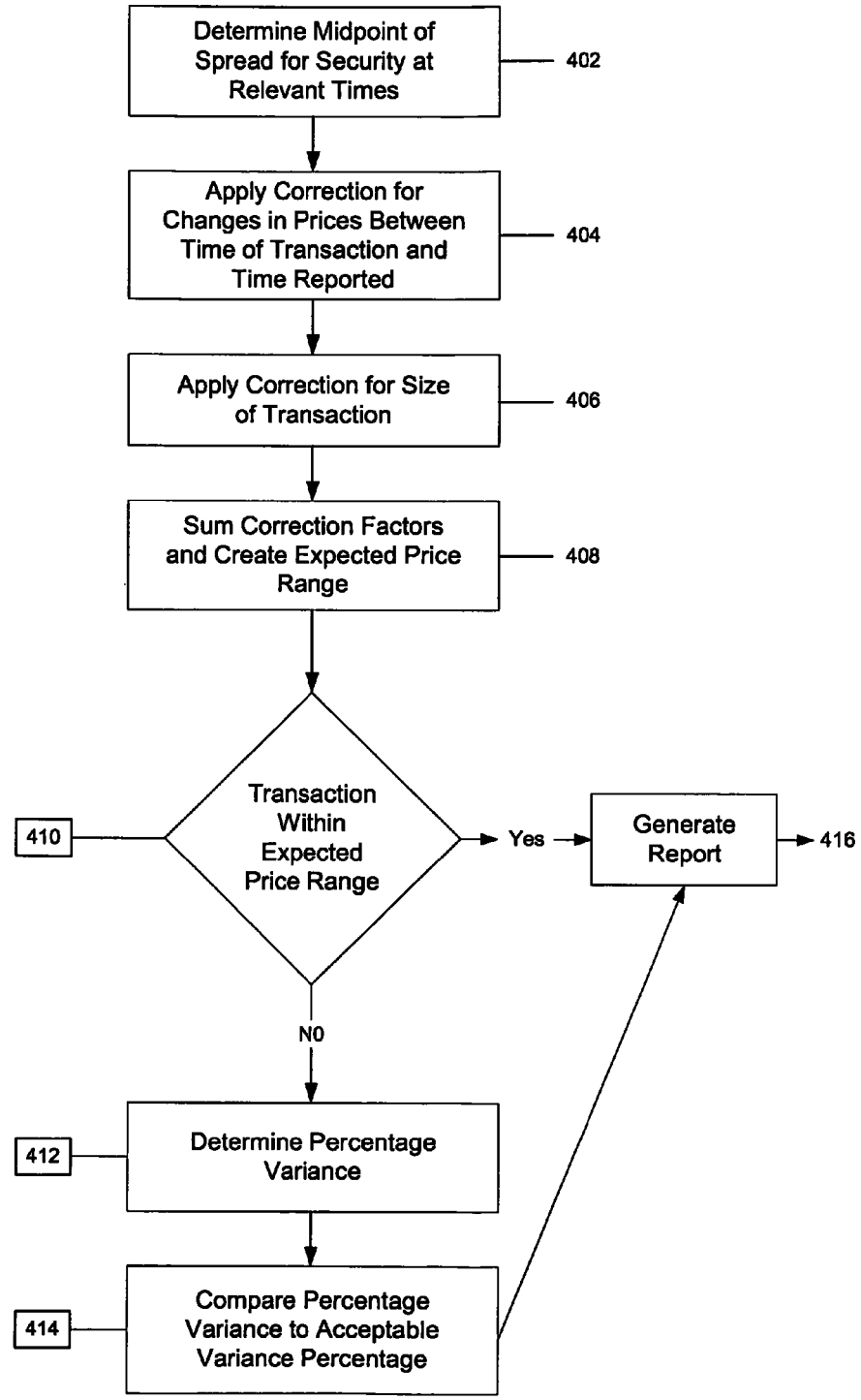
FIG. 4 is a flowchart illustrating additional aspects of system operation in a preferred embodiment.

As shown in FIG. 4, best execution server 110 determines the midpoint of the security's bid/offer spread for the reporting cycle closest in time to the audited transaction (Step 402). Where the audit rules specify that the audit should consider transaction information from multiple marketplaces or securities, a composite bid/offer spread may be calculated utilizing a weighted average based on relative volumes in the multiple marketplaces or securities, or other desired metric.

In a preferred embodiment, two corrections are applied to the bid/offer midpoint to create an expected-price range against which the actual price of the audited transaction may be compared. The first correction factor accounts for changes in price that may have occurred between the time of the actual transaction and the reported marketplace data (Step 404). In a preferred embodiment, this factor may be a function of the amount of time difference between the transaction and the reported data. Also in a preferred embodiment, this correction factor may be a function of a calculated price for the security, as will be described in more detail in Example 2 below.

The second correction factor accounts for the size of the audited transaction and the effect that transaction size may have on the appropriate price for the transaction (Step 406). More specifically, large transactions may justify a price significantly away from the market bid/offer spread midpoint, as will be illustrated in more detail in Examples 1 and 2 below.

Best execution server 110 sums the first and second correction factor and utilizes the composite correction factor to create an expected-price range for the transaction to be audited (Step 408). More specifically, best execution server 110 adds the composite correction quantity to the bid/offer midpoint to obtain an upper bound on the expected-price range. Similarly, it subtracts the composite correction quantity from the bid/offer midpoint to obtain a lower bound on the expected-price range.

The actual price of the transaction to be audited is compared to the calculated expected-price range to determine whether or not it falls within the range (Step 410). If the actual price is outside the expected-price range, a percentage variance from the range is determined (Step 412). In a preferred embodiment, the percentage variance may be calculated as:

$$\frac{\text{Min}(|EP_{UB} - AP|)(|EP_{LB} - AP|)}{AP}$$

Where:
$EP_{UB}$=the upper bound of the expected-price range
$EP_B$=the lower bound of the expected-price range
AP=the actual price of the transaction to be audited Best execution server 110 compares the calculated variance to the maximum acceptable variance for the transaction specified in the variance rule received from database server 104 to determine whether the transaction falls outside the acceptance variance level specified for that class of transaction (Step 414).

An audit report for the transaction is prepared comprising the results of the audit process (Step 416). One example of a suitable report that may be generated by best execution server 110 is described in more detail below in connection with FIG. 6.

The preferred embodiment of FIG. 4 will now be further described in connection with two illustrative examples.

Example 1

In the first illustrative example, an audit request is submitted for a transaction in a highly liquid equity security such as Microsoft common stock. For purposes of the present example, the following facts are assumed:
1. Transaction to be audited: Bought 100,000 shares of Microsoft at a price of 25.20 at 11:55:01 a.m. on Mar. 14, 2005.
2. Expected-price rule:
   a. Expected-price range=bid/offer midpoint of closest reporting cycle +/−(Correction Factor #1+Correction Factor #2).
   b. Correction Factor #1=0.01.
   c. Correction Factor #2:

| Transaction Size | Correction Factor #2 |
|---|---|
| Less than number of Microsoft shares traded in last 10 minutes | 0.0 |
| Greater than number of Microsoft shares traded in last 10 minutes | 0.1 |

3. Variance rule: Acceptable variance up to 1%.
4. Information concerning trading of Microsoft stock is provided to database server 104 every five seconds. Thus, the closest reporting cycle to the transaction to be audited is 11:55:00 a.m. on Mar. 14, 2005.
5. The bid/offer spread reported for Microsoft for the 11:55:00 reporting cycle is:
   Bid 25.12 Offer 25.13
   Thus, the bid/offer midpoint for the reporting cycle is 25.125.
6. Total number of Microsoft shares traded between 11:45:00 and 11:55:00 on Mar. 14, 2005 is less than 100,000.

For this example, Correction Factor #1 for the transaction is equal to a fixed 0.01. Furthermore, because the number of Microsoft shares traded in the previous 10 minutes is less than the size of the transaction to be audited, Correction Factor #2 is equal to 0.1.

The composite correction factor is thus:
0.01+0.1=0.11
The expected-price range is thus:
25.125+/−0.11→25.015 to 25.235
Since the transaction was executed at a price of 25.20, it is within the expected price range, and there is no need to apply the variance rule to the transaction.

Example 2

In the second illustrative example, an audit request is submitted for a transaction in an illiquid security such as a two year forward FX transaction for yen against the dollar. For purposes of the present example, the following facts are assumed:
1. Transaction to be audited: Bought $15M of 2 year yen at a price of 103.71 at 11:55:01 a.m. on Mar. 31, 2005.
2. Expected-price rule:
   a. Expected-price range=actual bid/offer midpoint of closest reporting cycle for which actual prices are available+/−(Correction Factor #1+Correction Factor #2).
   b. Correction Factor #2=$B/O_A$-$B/O_C$
      Where $B/O_A$=actual bid/offer midpoint of closest reporting cycle for which actual bid/offer prices are available; and B/O$_C$=a calculated bid/offer midpoint for the two year yen determined, for example, using a covered interest arbitrage calculation based on the current spot bid/offer midpoint and current yen and dollar interest rates.

c. Correction Factor #2:

| Transaction Size | Correction Factor #2 |
|---|---|
| 0-10M | 0.02 |
| 10-25M | 0.05 |
| 25-50M | 0.07 |
| 50-100M | 0.10 |
| >100M | 0.20 |

3. Variance rule: Acceptable variance up to 0.2%.

4. Information concerning FX trading is provided to database server 104 every five seconds. Thus, the closest reporting cycle to the transaction to be audited is 11:55:00 a.m. on Mar. 31, 2005. As those skilled in the art will recognize, however, because trading in the two-year yen is highly illiquid, there may be significant parts of the day during which no bid or offer is available for the two year yen. For purposes of the present example, it will be assumed that the most recent actual bid/offer information available for 2 year yen is from 9:40:30 a.m. and the bid/offer midpoint at that time was 103.45.

5. The spot bid/offer spread midpoint reported for the yen for the 11:55:00 reporting cycle is 111.92.

6. The 2-year yen interest rate is 0.10% and 2-year U.S. dollar interest rate is 4.10%, each quoted by market convention on a 360 day basis.

7. Variance rule: Acceptable variance up to 0.2%.

The calculated bid/offer midpoint for use in deriving Correction Factor #2 may be determined using a covered interest arbitrage calculation as follows:

1. [(365/360)×0.0010]+1=1.001013889

2. Take expression 1) above and square it (for annual compounding). The result is 1.002029.

3. Take result in step 2) and multiply by the spot dollar-yen rate of 111.92. Hence, 111.92×1.002029=112.147. This is the Yen part of the calculation.

4. Now for the US $ interest rate side. [(365/360)×0.0410]+1=1.041569444.

5. Take expression 4) and square it. The result is 1.0848669

6. Take the result in step 3) and divide it by the result in step 5): 112.147/1.0848669=103.37=calculated outward forward rate.

Since the most recently reported actual bid/offer midpoint for the two-year yen is 103.45 and the calculated bid/offer midpoint for the two year yen is 103.37, Correction Factor #1 is equal to: (103.45)−(103.37)=0.08. Furthermore, because the audited transaction is for 15M, Correction Factor #2 is equal to 0.05.

The composite correction factor is thus equal to: 0.08+0.05=0.13.

The expected-price range is thus:

103.45+/−0.13 103.32 to 103.58

Since the transaction was executed at a price of 103.91, it is outside the expected-price range for the transaction.

The variance from the range is calculated as:

$$\frac{\text{Min}(|103.71-103.58|)(|103.71-103.32|)}{103.71} = 0.12\%$$

This is within the acceptable variance range of 0.2%.

As previously noted, system 100 preferably comprises a trade confirmation server 112 for providing trade confirmation services in response to customer requests submitted via terminal 114. More specifically the trade confirmation function of the present system provides verification that both parties to a transaction have captured the same transaction details by comparing the transaction information entered by the parties for accuracy.

Figure 5:
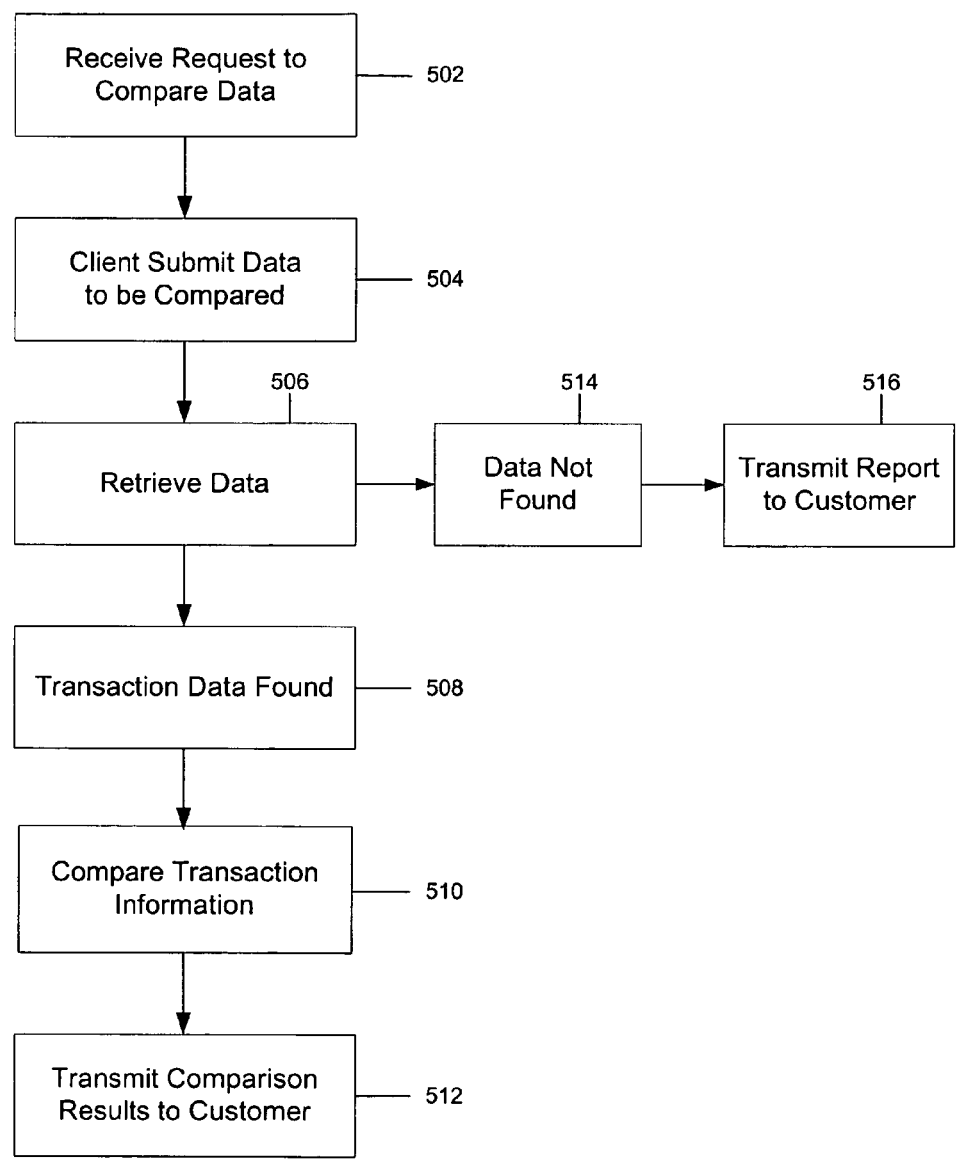
FIG. 5 is a flowchart illustrating yet additional aspects of system operation in a preferred embodiment.

A preferred embodiment for providing a trade confirmation service is now described in connection with FIG. 5. As shown in FIG. 5, trade confirmation server 112 receives a request from a user to confirm the terms of a transaction (Step 502). This may be a free-standing request or may be bundled with an audit request for the transaction. As above, the confirmation request may request verification of a single transaction or multiple transactions. For ease of illustration, a request for confirmation of a single transaction will be described below.

Trade confirmation server 112 transmits the submitted transaction data to database server 104 which stores the data in database 102 (Step 504). Database server 104 searches database 102 for submitted transactions that may represent the counterpart to the transaction for which verification has been requested (Step 506). For example, if a trade confirmation request is submitted for a buy transaction for $10M of the two year yen at 11:55:05, database server 104 searches database 102 for a corresponding sell transaction in that quantity submitted within a specified time frame (e.g., 10 minutes). If a corresponding transaction is found (Step 508, Yes) the system compares the transaction information to ensure that all commercial terms entered by the two parties regarding the transaction is identical (Step 510). The system also preferably determines the difference between specified execution times submitted for the transaction by the two traders and whether that time difference exceeds a pre-determined threshold. A verification report summarizing the results of this process is prepared and sent to the requestor (Step 512). In addition, if the counterparty to the requestor had earlier requested verification of the same transaction a verification report is prepared and sent to the counterparty, as well.

The trade confirmation service of the present system permits both parties to a transaction quickly and easily input the transaction's key commercial terms, have those terms compared, and receive the transaction details and report as to whether the trade had been properly recorded by both parties. Thus, the trade confirmation service of the present system permits trading entities to minimize the likelihood of unmatched transactions, particularly with respect to transactions executed over the telephone where a risk exists that the transaction details will not be written down accurately by one or both parties.

Widespread use of the trade confirmation service of the present system may also provide additional benefits. For example, where a trade is completed by telephone, the trader may not input the transaction into the deal capture system until hours after its execution which may result in the transaction being erroneously compared for auditing purposes with transactions that occurred several hours or even days after the trade was actually completed. A trader may therefore prevent the detection of a transaction that occurred at too high of a price by merely delaying inputting the transaction into the deal capture system. This problem can be overcome if all market participants use the trade confirmation service of the present system to confirm their transactions within a specified amount of time of execution.

Figure 6:
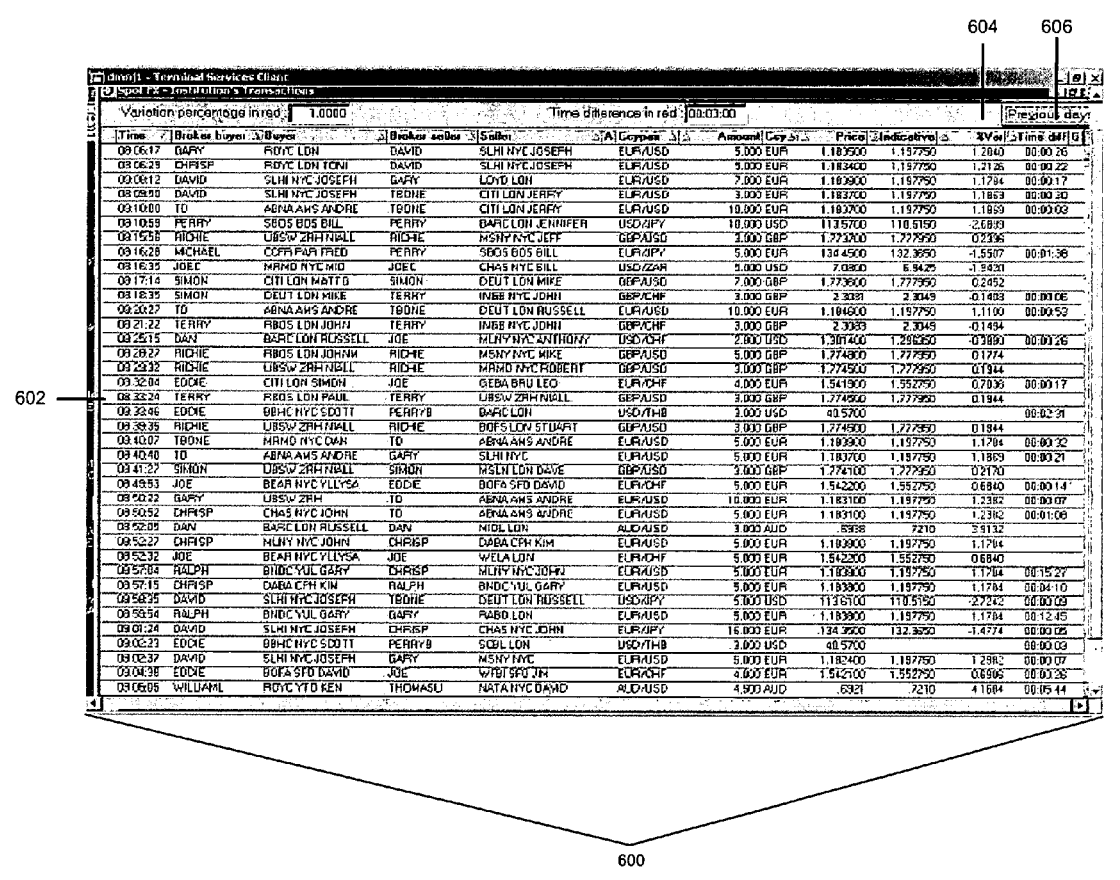

FIG. 6 illustrates a representative report generated by the present system for a group of foreign exchange transactions. A report may be generated in response to a single request received from a subscriber, as a standing request from a subscriber, saved at the system, to generate reports on a regular basis (i.e., once a month or every six months) or in response to a request submitted from the subscriber terminal where the terminal has been programmed to automatically send audit requests to the system on a regular basis. Each line or record 602 represents a transaction and provides the time of the transaction, the buyer, seller, currency pair, volume or amount in millions, and price. Transactions outside the specified variance threshold (e.g., 1%) are highlighted, as illustratively shown at 604. The time difference field 606 provides the variance between the trades execution time. In a preferred embodiment, an audit report may also comprise fields identifying a regulatory entity, the time a transaction was reported to the regulatory entity, the settlement service used, closing and opening prices for the security, a day range for the security, and any other desired information relating to the transaction. The report may be provided on screen and/or available to print. If desired, a report may also be provided to a trader, providing information concerning the offers, bids, and trades of a financial instrument at points prior, during, and after the execution of an order by the trader. The report can be provided as a table, graph or other suitable form.

Figure 7:
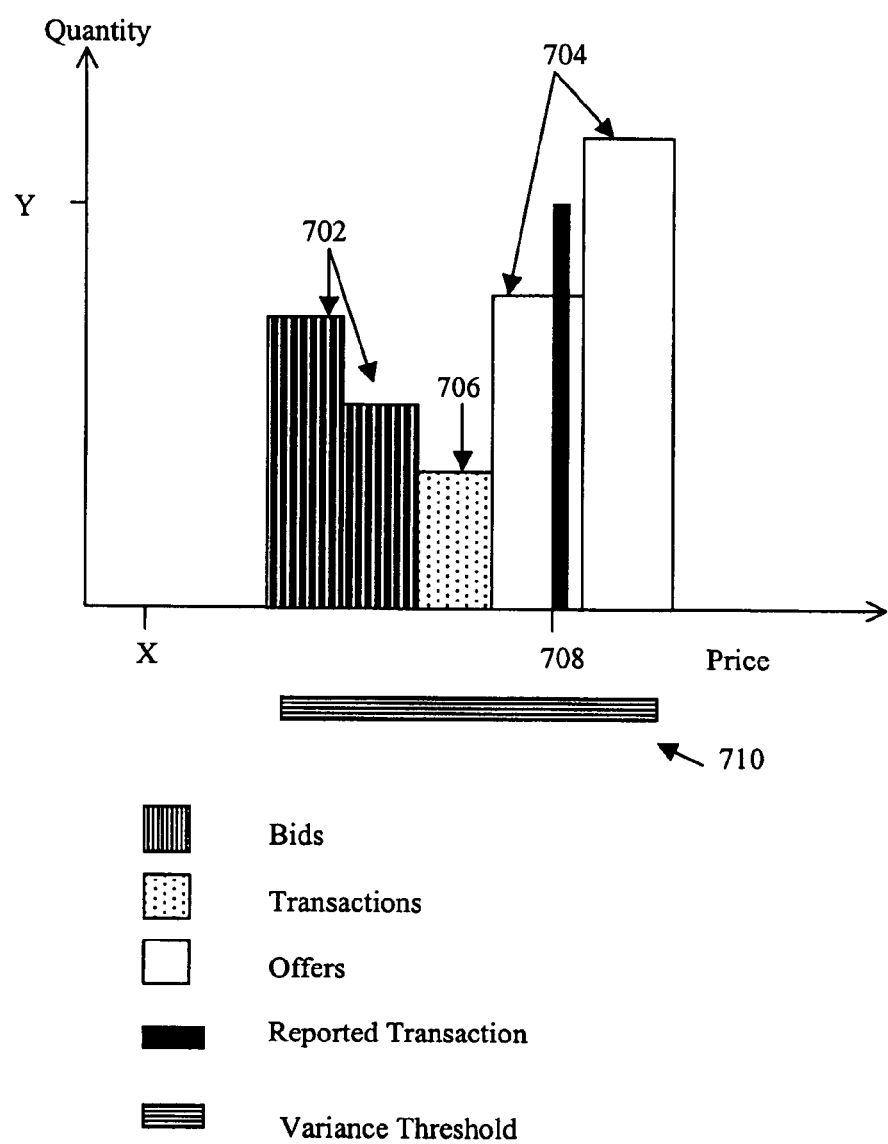
FIG. 7 is a graph illustrating a comparison of a transaction to historical transaction data in a preferred embodiment.

A report may alternatively or in addition be presented using a graphical representation as shown in FIG. 7. The graph displays the volume (Y-axis) against price (X-axis) and displays bid data 702, offer data 704 and transaction data 706 from database 102 for the date, time, and instrument. The bids 702 and offers 704 represent the spread, or the difference between the offers and the bids for a given financial instrument. A bar 708 represents the reported transaction at price X for Quantity Y and assists in placing the client's trade in the context of the market at the time the trade was executed. A purchase is compared to the market offer 704 (higher price), and a sale is compared to the market bid 702 (lower price), thus the trade was inside the expected price in the illustrative example of FIG. 7. The result thus indicates that the transaction was fair. However, if the bar 708 was too far from the average trade, this would indicate to the client that further investigation may be warranted to ensure compliance with trading regulations. Where the audit request is for a transaction proposed, but not yet completed, a large variance from bar 708 would indicate to the customer that the trade should not be executed and may, in a preferred embodiment, automatically prevent the execution from occurring.

Figure 8:
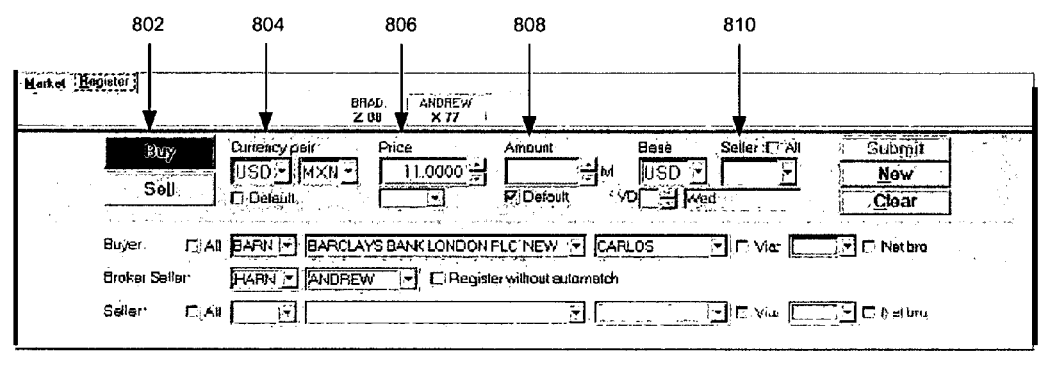

FIG. 8 shows a preferred embodiment of a graphical user interface for use by a trader at a terminal 114 to enter transaction data and request audit and/or transaction-confirmation reports. As illustrated in FIG. 8, the user is preferably presented with a data entry screen to enable entry of transaction data. In the preferred embodiment of FIG. 8, the screen is adapted for entry of foreign exchange transactions. As will be recognized, however, analogous screens may be provided for different markets. The screen preferably comprises locations for entering the following information: whether the transaction is a buy or sell 802; the financial instrument bought or sold 804; the price paid for the financial instrument 806; the amount and currency 808 of the transaction; and the counterparty 810. The trade capture screen further preferably comprises user tools for defining the instrument traded. These tools preferably include look lists, searches, and contract builders. For example, for foreign currency transactions, these tools may define currency codes and months to simplify identification of traded instruments.

Each trading platform preferably implements procedures to accurately capture "trade time" (using a time stamp machine). The time stamp thus adds a second check if both parties to the transaction are using the same data capture system or if their data capture systems hold the actual trade execution time (time stamp later entered). The time of the transaction may be determined in accordance with internal procedures to ensure that this information was captured accurately, for example by using time stamps on trade tickets or immediate data capture in internal systems. In non-electronic systems, it is difficult to ascertain the exact execution time of a transaction, therefore the data is preferably stored in time blocks rational for such marketplaces, for example each minute or every five minutes. It is then possible to automate the upload of the transaction data, provided that the instrument identification used in the database 102 is accurately mapped by the user. The upload file preferably contains: a user identification, financial instrument identification, the date and time, whether the transaction was a buy or sell, the price and the quantity.

While the present invention has been described in conjunction with specific embodiments, it is evident that numerous alternatives, modifications and variations will be apparent to those skilled in the art in view of the foregoing description.

What is claimed is:

1. A method for enabling analysis of financial instrument transactions against historical transactions, the method comprising the steps of:
   inputting transaction data related to trading of a financial instrument in a financial market;
   transmitting said transaction data from said financial market to one or more server computers;
   storing said transaction data in a memory of said one or more server computers;
   processing said transaction data stored in said memory of said one or more server computers; and
   generating at least one report which compares an already executed transaction against said transaction data stored in said memory of said one or more server computers for verification that the already executed transaction was executed at a reasonable price in relation to a time the already executed transaction was executed.

2. The method of claim 1, wherein said transaction data is transmitted from said financial markets via an application program interface.

3. The method of claim 2, wherein said application program interface defines what transaction data is transmitted to said one or more server computers.

4. The method of claim 1, wherein said financial markets are electronic trading systems.

5. The method of claim 1, wherein said financial markets are non-electronic trading systems.

6. The method of claim 1, wherein said transaction data is transmitted to said one or more server computers via an electronic message.

7. The method of claim 6, wherein said electronic message contains a marketplace identification, a financial instrument identification, the time of execution of a trade, orders at the best bid, orders as the best offer, the quantity of the financial instrument bid, the quantity of the financial instrument offered, and order book data.

8. The method of claim 2, wherein said transaction data is transmitted to said one or more server computers with each change of information associated with a financial instrument.

9. The method of claim 6, wherein said transaction data is transmitted to said one or more server computers at a specified interval of time.

10. The method of claim 9, wherein said specified interval of time is no greater than ten seconds.

11. The method of claim 1, wherein said transaction data includes the price at which the transactions were executed.

12. The method of claim 11, wherein said transaction data includes the time at which the transactions were executed.

13. The method of claim 12, wherein said transaction data includes the quantity of financial instruments traded.

14. The method of claim 1, wherein said transaction data is stored in said memory of said one or more server computers in accordance with predetermined parameters.

15. The method of claim 14, wherein said parameters include a definition of the data period, market hours, and a measure of market depth for a class of financial instruments.

16. The method of claim 15, wherein said parameters define a class of transactions.

17. The method of claim 1, wherein said transaction data is stored in said memory of said one or more server computers according to the type of financial instrument and the time a transaction is executed.

18. The method of claim 17, wherein said transaction data includes the quantity of financial instrument trade, the average price of the financial instrument traded at the time the trade was executed and the market depth at the time the trade was executed.

19. The method of claim 1, comprising the further step of verifying that the buyer and seller in a trade have provided the same transaction data for said trade.

20. The method of claim 1, comprising the further step of providing a trader data related to the offers, bids and trades of a financial instrument in a financial market at points prior, during and after the execution of an order by said trader for said financial instrument.

21. The method of claim 1, wherein said step of processing said transaction data includes comparing an executed trade to the transaction data stored in said memory of said one or more server computers for said financial instrument related to said trade, where said transaction data stored in said memory represents the market at the time the trade was executed.

22. The method of claim 1, wherein said report includes the time of execution of a trade, the name of the broker on the buying side of said trade, the name of the broker on the selling side of said trade, the name of the actual buyer, the name of the actual seller, the financial instrument traded, the quantity of financial instrument traded, the currency of said trade, the price of said trade, the average price for the financial instrument in the market, the variance in price between the average price for the financial instrument in the market and the price of said trade, and the variance in time between the average time related to the average price for said financial instrument and the time of said trade.

23. The method of claim 22, wherein an allowable variance between the price of said transaction and the expected price range of said transaction is based on a percentage difference specified by said subscriber.

24. The method of claim 22, wherein said allowable variance between the price of said transaction and the expected price range of said transaction is based on a percentage difference determined by said one or more server computers.

25. The method of claim 21, wherein said summary is provided to subscribers at predetermined intervals of time as either a paper report or an electronic message.

26. The method of claim 25, wherein said summary is provided to said subscribers in response to requests automatically sent to said one or more server computers by said subscriber terminals at predetermined intervals.

27. The system of claim 1, wherein said report can be viewed by a subscriber at said subscriber's terminal.

28. The method of claim 1, additionally comprising a step of retrieving said transaction data in response to a request received from one or more subscriber terminals.

29. The method of claim 28, wherein said request is a request for said one or more server computers to perform an audit of a transaction.

30. The method of claim 28, wherein said request is a request for said one or more server computers to verify that both parties to a transaction have entered matching transaction details.

31. The method of claim 30, wherein said one or more server computers determines a difference between execution times submitted for said transaction by said parties to said transaction to determine whether the execution times exceed a pre-determined threshold.

32. The method of claim 30, wherein said one or more server computers send a report of the verification results of the matching transaction details to said one or more subscriber terminals.

33. The method of claim 29, wherein said one or more server computers apply predetermined audit rules to perform the audit of the transaction in response to said request.

34. The method of claim 33, wherein said one or more server computers utilize said audit rules to identify and retrieve data from said memory.

35. The method of claim 34, wherein said audit rules specify how said one or more server computers calculates an expected price range for a transaction.

36. The method of claim 35, wherein said audit rules specify an allowable variance between the price of said transaction and said expected price range for said transaction.

37. The method of claim 35, wherein said expected price range of a transaction is a function of a first correction factor for changes in price that occurred between the time of the transaction to be audited and the reported financial market data.

38. The method of claim 35, wherein said expected price range of a transaction is a function of a second correction factor for the size of the transaction to be audited and the effect that transaction size has on the price for said audited transaction.

39. The method of claim 37, wherein said one or more server computers compare said transaction to the expected price range for the transaction.

40. The method of claim 39, wherein if said transaction falls outside of said expected price range, said one or more server computers determine a percentage variance of said transaction from said expected price range and compares said percentage variance to said allowable variance.

41. The method of claim 29, wherein said one or more server computers generates a report of said audit of the transaction.

* * * * *